United States Patent
Kim (10) Patent No.: US 12,123,948 B2
(45) Date of Patent: Oct. 22, 2024

(54) LiDAR SENSOR HAVING PARAMETER OPTIMIZATION FUNCTION AND TOF CALCULATION METHOD THEREOF

(71) Applicant: HYUNDAI MOBIS CO., LTD., Seoul (KR)

(72) Inventor: Young Kyun Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 897 days.

(21) Appl. No.: 17/089,403

(22) Filed: Nov. 4, 2020

(65) Prior Publication Data

US 2021/0156998 A1     May 27, 2021

(30) Foreign Application Priority Data

Nov. 22, 2019 (KR) .......................... 10-2019-0151396

(51) Int. Cl.
*G01S 17/00* (2020.01)
*G01S 17/08* (2006.01)
*G04F 10/00* (2006.01)

(52) U.S. Cl.
CPC ............ *G01S 17/08* (2013.01); *G04F 10/005* (2013.01)

(58) Field of Classification Search
None
See application file for complete search history.

(56) References Cited

U.S. PATENT DOCUMENTS

2008/0158042 A1* 7/2008 Ishio ................ G01S 7/4868
    342/54
2017/0234976 A1* 8/2017 Grauer ................ G01S 17/18
    356/5.04

FOREIGN PATENT DOCUMENTS

| | | |
|---|---|---|
| JP | 2008232800 | 10/2008 |
| KR | 20190005377 | 1/2019 |
| KR | 20190048135 | 5/2019 |
| KR | 101998859 | 7/2019 |
| KR | 20190076725 | 7/2019 |

OTHER PUBLICATIONS

Korean Office Action for Korean Application No. 10-2019-0151396 dated Jan. 27, 2021 (9 pgs).

* cited by examiner

*Primary Examiner* — Hovhannes Baghdasaryan
(74) *Attorney, Agent, or Firm* — MORGAN, LEWIS & BOCKIUS LLP (57) ABSTRACT

A LiDAR sensor having a parameter optimization function may include: a laser diode configured to emit a laser light signal; a photo diode configured to receive a maximum laser light reflection signal reflected from a target object at a scannable maximum distance in the laser light signal; and a parameter setting unit configured to set a parameter related to an output intensity of the laser light signal or a reception intensity of the laser light signal based on the maximum laser light reflection signal.

17 Claims, 4 Drawing Sheets

LiDAR SENSOR HAVING PARAMETER OPTIMIZATION FUNCTION AND TOF CALCULATION METHOD THEREOF

CROSS-REFERENCE TO RELATED APPLICATION

The present application claims priority to and the benefit of Korean Patent Application No. 10-2019-0151396 filed on Nov. 22, 2019, the entire contents of which are incorporated herein by reference.

TECHNICAL FIELD

The present disclosure relates to a LiDAR sensor, and for example, to a LiDAR sensor having a parameter optimization function and a TOF calculating method thereof.

BACKGROUND

A LiDAR sensor uses a Laser Diode (LD) and a Photodiode (PD) Array for detecting a distance to a target object. The LD emits laser light toward a target object. The PD receives laser light hitting and reflected from the target object, and converts the laser light into a current and converts the laser light into a signal.

The LiDAR sensor checks a signal interval between an emission time point of the laser light and a reception time point of the reflected laser light and calculates a distance to the target object. In the process, when a signal intensity of the laser light hitting and reflected from the target object is small, there occurs a situation where the LiDAR sensor cannot accurately detect the target object.

In order to respond to the occurrence of the situation, in the LiDAR sensor, a separate parameter for adjusting an output level of emitted laser light is set so as to detect an object at a maximum detection distance, and when the output level of the LD emitted according to the set parameter is set more than necessary, there is a problem in that energy efficiency deteriorates and the signal to noise ratio is decreased.

SUMMARY

The present disclosure provides a LiDAR sensor having a parameter optimization function which performs optimization on a relevant parameter so as to efficiently detect an object at a maximum detection distance based on an intensity of a maximum laser light reflection signal that detects the object at the maximum detection distance, and a TOF calculating method thereof.

An exemplary embodiment of the present disclosure provides a LiDAR sensor having a parameter optimization function, including: a laser diode configured to emit a laser light signal; a photo diode configured to receive a maximum laser light reflection signal reflected from a target object at a scannable maximum distance in the laser light signal; and a parameter setting unit configured to set a parameter related to an output intensity of the laser light signal or a reception intensity of the laser light signal based on the maximum laser light reflection signal.

The LiDAR sensor may further include a Laser Diode (LD) controller which changes an output range of the laser diode based on the set parameter and controls the laser light signal to be emitted based on the changed output range.

The photo diode may be applied with a bias voltage changed according to the set parameter, and may adjust an intensity of the maximum laser light reflection signal by using the changed bias voltage and output the maximum laser light reflection signal of which the intensity is adjusted.

The LiDAR sensor may further include a first amplifier which adjusts an intensity of the maximum laser light reflection signal by using a gain changed according to the set parameter and outputs the maximum laser light reflection signal of which the intensity is adjusted.

The LiDAR sensor may further include an Analog to Digital Converter (ADC) which digitally converts the maximum laser light reflection signal of which the intensity is adjusted according to the set parameter ad transmits the converted maximum laser light reflection signal to the parameter setting unit.

The LiDAR sensor may further include: a comparing unit which compares the maximum laser light reflection signal of which the intensity is adjusted according to the set parameter with a reference voltage and outputs a comparison result; and a signal intensity determining unit which determines the intensity of the maximum laser light reflection signal by using the comparison result and transmits a determination result to the parameter setting unit.

When the intensity of the maximum laser light reflection signal exceeds a preset saturation intensity, the parameter setting unit may change the parameter.

When the intensity of the maximum laser light reflection signal is equal to or smaller than the saturation intensity and exceeds a preset threshold, the parameter setting unit may determine that a current state is an optimization state of the parameter.

The LiDAR sensor may further include a TDC which calculates a TOF value by using a time interval between an emission time point of a laser light reflection signal emitted according to the parameter in the optimization state and a reception time point of a laser light reflection signal of which an intensity is changed according to the parameter in the optimization state.

Another exemplary embodiment of the present disclosure provides a method of calculating a TOF by a LiDAR sensor, the method including: a target object detecting operation of receiving a laser light reflection signal; a parameter setting operation of setting a parameter related to an output intensity of the laser light reflection signal or a reception intensity of the laser light reflection signal based on a maximum laser light reflection signal reflected from a target object at a maximum distance among the received laser light reflection signals; and a TOF calculating operation of calculating a TOF value by using the laser light reflection signal according to the set parameter.

The parameter may include an output range of a laser light signal, a bias voltage of a photo diode which receives the laser light reflection signal, and a gain of an amplifier for amplifying the laser light reflection signal.

The parameter setting operation may include changing at least one of the parameters when the intensity of the maximum laser light reflection signal exceeds a preset saturation signal.

The parameter setting operation may include determining that optimization of the parameter is completed when the intensity of the maximum laser light reflection signal is equal to or smaller than the saturation signal and exceeds a preset threshold.

According to the LiDAR sensor having the parameter optimization function according to the exemplary embodiment of the present disclosure, it is possible to efficiently defect an object at a maximum detection distance by performing optimization on a parameter related to the detection of a target object based on an intensity of a laser light reflection signal detecting the object at the maximum detection distance.

A noise level of a laser light reflection signal reflected from a target object and detected in a photo diode is minimized through the optimization of the parameter, so that it is possible to improve a Signal to Noise Ratio (SNR).

It may be possible to increase a lifespan and improve durability through the optimization of a bias voltage of a photo diode and a consumption current of an amplifier.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings. First of all, it should be noted that in giving reference numerals to elements of each drawing, like reference numerals refer to like elements even though like elements are shown in different drawings. It should be understood that although the exemplary embodiment of the present disclosure are described hereafter, the spirit of the present disclosure is not limited thereto and may be changed and modified in various ways by those skilled in the art.

Figure 1:
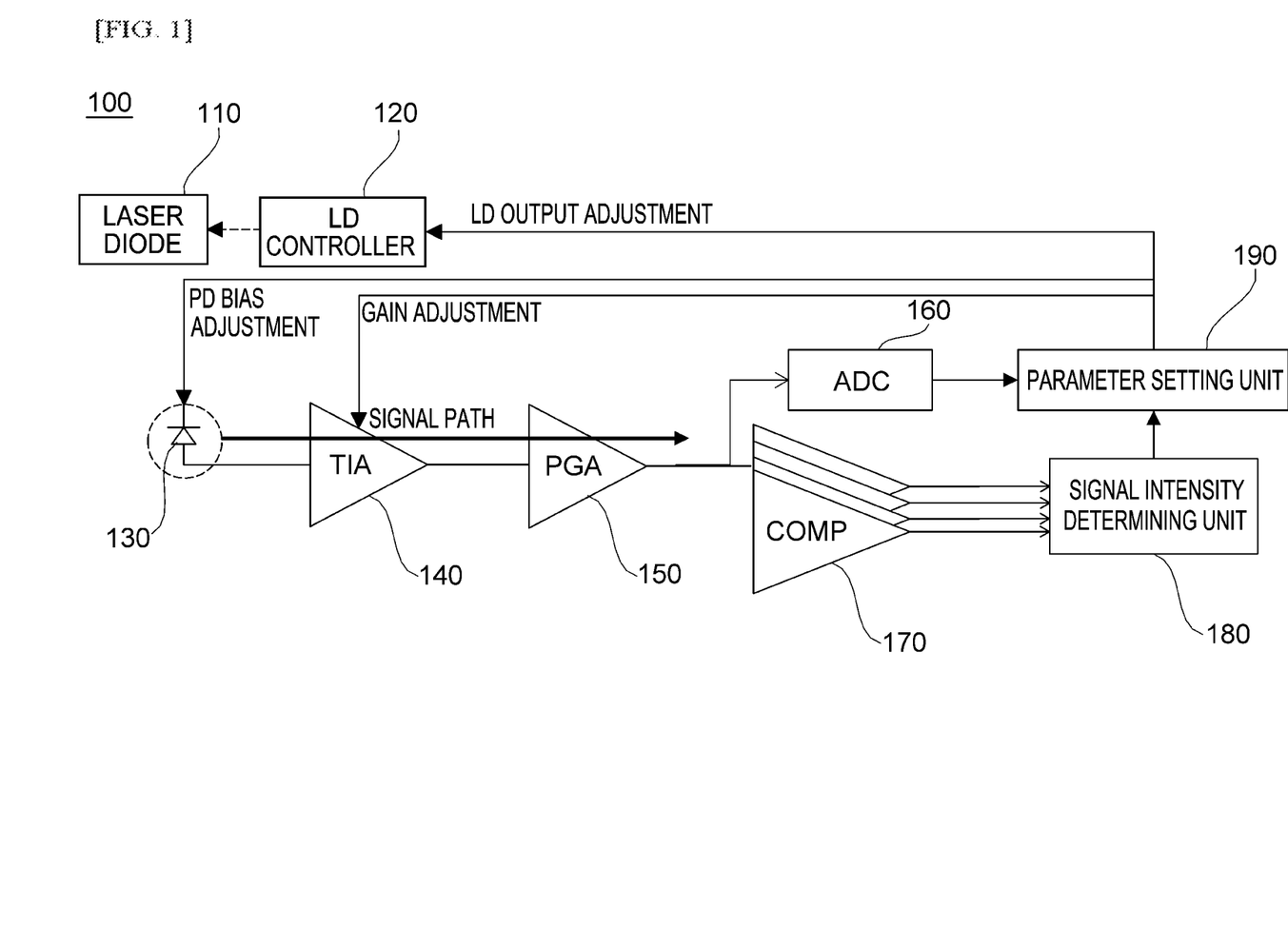
FIG. 1 is a diagram illustrating a partial configuration of a LiDAR sensor having a parameter optimization function in one form of the present disclosure.

FIG. 1 is a diagram illustrating a partial configuration of a LiDAR sensor having a parameter optimization function in some forms of the present disclosure.

Referring to FIG. 1, the LiDAR sensor 100 having the parameter optimization function in some forms of the present disclosure may be rotated by a motor. The LiDAR sensor 100 may detect an object at a maximum scannable distance by emitting a laser light signal while rotating. The LiDAR sensor 100 may receive a maximum laser light reflection signal reflected from the object at the maximum scannable distance.

The LiDAR sensor 100 is characterized in that the LiDAR sensor 100 is formed with a circuit structure which monitors a laser light reflection signal received through a signal path, and includes an algorithm which reflects an intensity of a maximum laser light reflection signal reflected from an object at a maximum distance in real time through the monitoring and trims an output level of a laser light emission signal.

To this end, the LiDAR sensor 100 may include a laser diode 110, a Laser Diode (LD) controller 120, a photo diode 130, a first amplifier 140, a second amplifier 150, an ADC 160, a comparing unit 170, and a signal intensity determining unit 180, and a parameter setting unit 190. The LiDAR sensor 100 is not limited to the foregoing configuration, and may additionally include the configuration of FIG. 4.

The LD 110 may emit a laser light signal toward a target object according to a control of the LD controller 120.

The LD controller 120 may control the LD 110 so as to emit a laser light signal.

The photo diode 130 may receive the laser light reflection signal that hits the target object and is reflected. The photo diode 130 may convert the received laser light reflection signal into an electric signal and transmit the converted electric signal.

The first amplifier 140 may receive the laser light reflection signal from the photo diode 130. The first amplifier 140 may be a TransImpedance Amplifier (TIA). The first amplifier 140 may amplify the intensity of the laser light reflection signal by applying a variable gain.

The second amplifier 150 may receive the laser light reflection signal amplified from the first amplifier 140. The second amplifier 150 may be a programmable gain amplifier. The second amplifier 150 may amplify the intensity of the laser light reflection signal by applying a predetermined gain.

The ADC 160, which is an Analog to Digital Converter, may perform a digital conversion on the laser light reflection signal.

The comparing unit 170 may include a plurality of comparators having different reference voltages. The number of comparators may be n (n is an integer equal to or larger than 1). Each of the plurality of comparators may compare a reference voltage and a voltage level of the laser light reflection signal and output a comparison result.

The signal intensity determining unit 180 may determine the intensity of the laser light reflection signal by using the comparison result of the comparing unit 170.

The parameter setting unit 190 may determine an intensity of a maximum laser light reflection signal reflected from an object at a maximum distance by using the signal intensity determined by the signal intensity determining unit 180 and the signal intensity output from the ADC 160.

The parameter setting unit 190 may compare the maximum laser light reflection signal and a predetermined saturation signal and set a parameter related to an output intensity of the laser light signal or a reception intensity of the laser light signal by using the comparison result. Herein, the parameter may include a gain of the first amplifier 140, a bias voltage of the photo diode 130, or an output range of the LD controller 120.

The intensities of the laser light emission signal and the laser light reflection signal are controlled according to the set parameters, and through this, there is an effect in that inefficient energy use is decreased and a signal to noise ratio is improved. Further, the laser light reflection signals reflected from objects closer than the object at the maximum distance have larger intensities than that of the saturation signal, so that most of the objects may be detected.

Figure 2A:
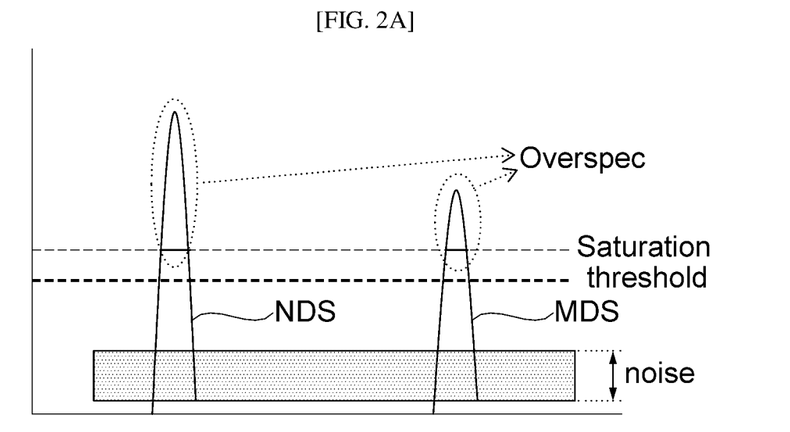
FIGS. 2A and 2B are diagrams illustrating a parameter optimization according to an intensity of a laser light reflection signal.
Figure 2B:
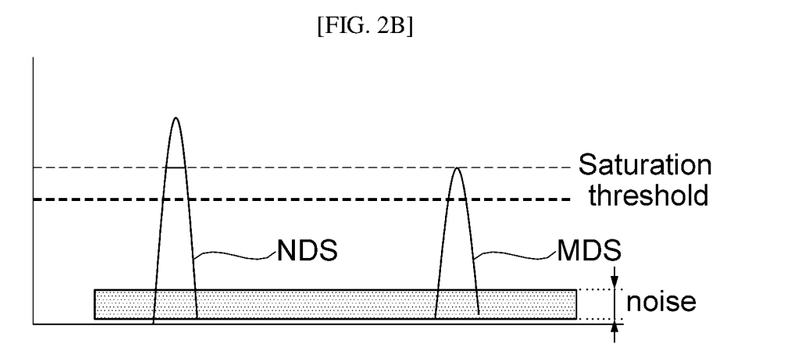

FIG. 2 is a diagram illustrating a parameter optimization according to an intensity of a laser light reflection signal.

FIG. 2A, a maximum laser light reflection signal MDS reflected from an object at a maximum distance, and a proximity laser light reflection signal NDS reflected from an object closer than the maximum distance may be checked. The LiDAR sensor 100 may detect an object from the maximum laser light reflection signal MDS based on a threshold, and the maximum laser light reflection signal MDS and the proximity laser light reflection signal NDS have the signal intensities larger than the threshold, so that an overspec is generated. The overspec is a reason for reducing energy efficiency of the LiDAR sensor 100. The parameter setting unit 190 may compare the maximum laser light reflection signal MDS and a saturation signal and determine whether to set a parameter. The parameter setting unit 190 may perform a parameter optimization by comparing the maximum laser light reflection signal MDS and the threshold.

When the maximum laser light reflection signal MDS exceeds the saturation signal, the parameter setting unit 190 may set a current gain of the first amplifier 140 to be decreased. Further, the parameter setting unit 190 may set a current bias voltage of the photo diode 130 to be decreased according to the saturation signal. Further, the parameter setting unit 190 may set a current output range of the LD controller 120 to be decreased.

In the meantime, the parameter setting unit 190 may generate a lookup table in which the parameter values of a gain for each signal intensity, a bias voltage, and an output range, are set. The parameter setting unit 190 may adjust the gain, the bias voltage, the output range, and the like by using the parameter values of the lookup table corresponding to the saturation signal.

The parameter setting unit 190 may change any one of the plurality of parameters or change two or more parameters together as necessary.

In FIG. 2B, the LiDAR sensor 100 may detect the maximum laser light reflection signal MDS and the proximity laser light reflection signal NDS by using the changed parameter. In comparison with FIG. 2A, it can be seen that the maximum laser light reflection signal MDS and the proximity laser light reflection signal NDS have the smaller signal intensities. Further, in comparison with FIG. 2A, it can be seen that the maximum laser light reflection signal MDS and the proximity laser light reflection signal NDS have the decreased noise levels, so that the Signal to Noise Ratio (SNR) is improved.

Figure 3:
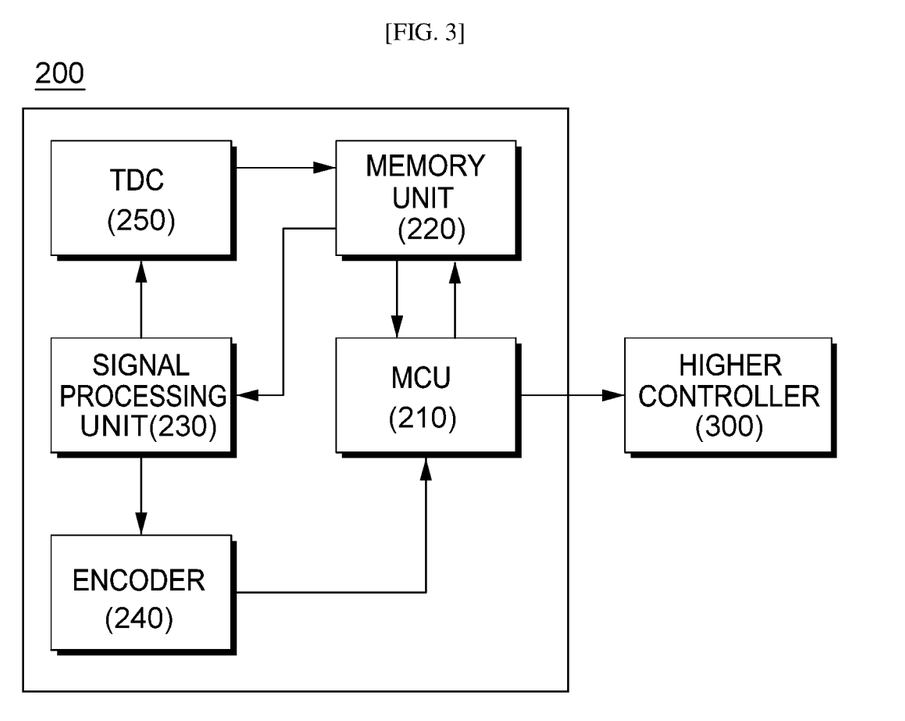
FIG. 3 is a diagram illustrating a TOF calculation configuration of the LiDAR sensor having the parameter optimization function.

FIG. 3 is a diagram illustrating a TOF calculation configuration of a LiDAR sensor having a parameter optimization function.

Referring to FIGS. 1 and 3, a LiDAR sensor 200 having a parameter optimization function may include a TOF calculation configuration in addition to the LiDAR sensor 100 of FIG. 1.

The LiDAR sensor 200 may include an MCU 210, a memory unit 220, a signal processing unit 230, an encoder 240, and a TDC 250.

The MCU 210 may be operated in a parameter value calculation mode when the LiDAR sensor 200 detects an object. The MCU 210 may receive a laser light emission signal from the LD controller 120 and store the received laser light emission signal in the memory unit 220. The MCU 210 may receive a laser light reflection signal from the ADC 160 or the signal intensity determining unit 180 and store the received laser light reflection signal in the memory unit 220.

The memory unit 220 may be a Static Random Access Memory (SRAM). The memory unit 220 may store intensity information, emission time points, and reception time points of the laser light emission signal and the laser light reflection signal.

The signal processing unit 230 may include the first amplifier 140. The signal processing unit 230 may adjust a gain of the first amplifier 140 according to a voltage level Vth of the saturation signal. The signal processing unit 230 may change the intensity of the laser light reflection signal through the adjustment of the gain of the first amplifier 140.

The encoder 240 may encode the changed intensity of the laser light reflection signal and transmit the encoded laser light reflection signal to the MCU 210.

The MCU 210 may be provided with the parameter setting unit 190 that sets a parameter based on the intensity of the laser light reflection signal.

The signal processing unit 230 may transmit the laser light signal of which the signal intensity is changed according to the parameter to the TDC 250.

The TDC 250 may calculate a plurality of TOF values according to the transmission/reception time points of the laser light emission signal and the laser light reflection signal. The TDC 250 may store the plurality of TOF values in the memory unit 220.

The MCU 210 may calculate an average TOF Value of the plurality of TOF values stored in the memory unit 220. The MCU 210 may transmit the average TOF value to a higher controller 300.

Figure 4:
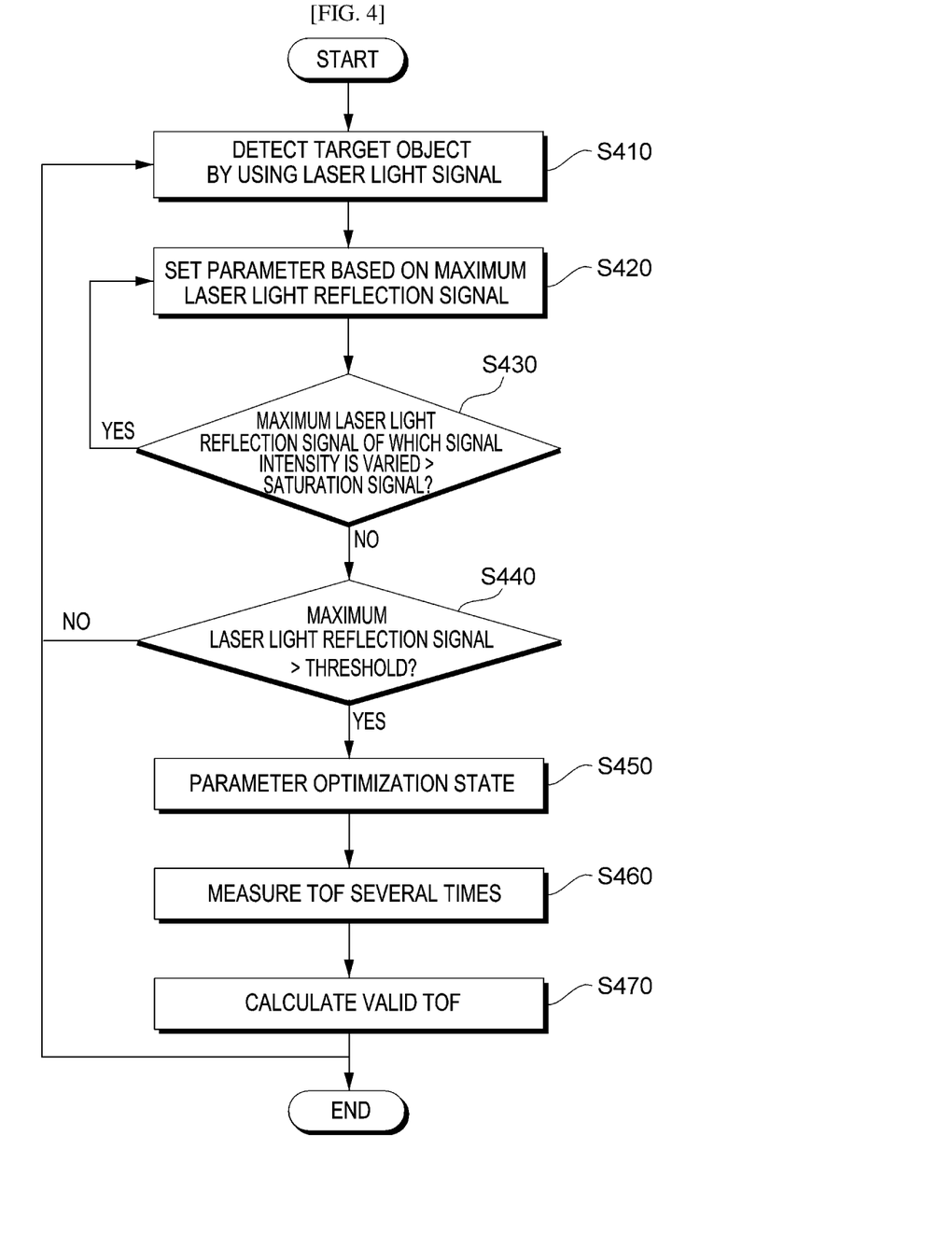
FIG. 4 is a flowchart illustrating a TOF calculation method of the LiDAR sensor in one form of the present disclosure.

FIG. 4 is a flowchart illustrating a TOF calculation method of the LiDAR sensor in some forms of the present disclosure.

Referring to FIGS. 1, 3, and 4, the TOF calculation method of the LiDAR sensor in some forms of the present disclosure may include operations S410 to S480.

In operation S410, the laser diode 110 emits a laser light signal toward a target object. The photo diode 130 receives a laser light reflection signal reflected from the target object. The TDC 250 calculates TOF values for a target object at a maximum distance by using transmission/reception time points of the laser light emission signal and the laser light reflection signal. The MCU 210 obtains distance information of the target object at the maximum distance by calculating an average value of the TOF values. In this case, an LD output range of the LD controller 120 may be set to a maximum state, a bias voltage of the photo diode 130 may be set to a maximum state, and a gain of the first amplifier 140 may be set to a maximum state.

In operation S420, the parameter setting unit 190 may set various parameters according to an intensity of a maximum laser light reflection signal reflected from the target object at the maximum distance. The parameter setting unit 190 may set various parameters by using a lookup table in which a parameter value for each signal intensity is stored. When the intensity of the maximum laser light reflection signal exceeds a preset saturation signal, the parameter setting unit 190 may set the parameters so as to reduce the output range of the LD controller 120, the reduce the bias voltage of the photo diode 130, or reduce eth gain of the first amplifier 140.

In operation S430, the parameter setting unit 190 may receive the laser light reflection signal of which the signal intensity is varied according to the parameter set in operation S420. In the laser light reflection signal of which the signal intensity is varied, the maximum laser light reflection signal MDS and a proximity laser light reflection signal NDS may be included. The parameter setting unit 190 may compare the laser light reflection signal of which the signal intensity is varied and a saturation signal Vth. When it is determined that the maximum laser light reflection signal of which the signal intensity is varied exceeds the saturation signal Vth, the method returns to operation S420 and the parameter setting unit 190 resets various parameters.

In operation S440, when the maximum laser light reflection signal is equal to or smaller than the saturation signal Vth in operation S430, the parameter setting unit 190 may determine whether the maximum laser light reflection signal exceeds a threshold Vth2. When the maximum laser light reflection signal is equal to or smaller than the threshold Vth2, the method returns to operation S410 and the parameter setting unit 190 emits a laser light signal through the laser diode 110 in order to obtain information about the object at the maximum distance.

In operation S450, when the maximum laser light reflection signal exceeds the threshold Vth2, the parameter setting unit 190 determines that the current state is a parameter optimization state. Herein, the parameter may be reset in more consideration of a movement speed of the detected target object.

In operation S460, the TDC 250 performs a burst operation several times and measures a TOF. The number of times of the TOF measurement may be within several ten of times per second, and may be appropriately set as necessary.

In operation S470, the MCU 210 may calculate an average value of the plurality of TOF values. The MCU 210 may calculate a valid TOF value through the TOF average value. Herein, the valid TOF value may be calculated according to a completion of one cycle from operation S410 to operation S470.

Although some forms of the present disclosure has been described for illustrative purposes, those skilled in the art will appreciate that various modifications, additions and substitutions are possible, without departing from the scope and spirit of the disclosure. Therefore, the embodiments disclosed in the present disclosure and the accompanying drawings are not intended to limit the technical spirit of the present disclosure, but are intended to illustrate the scope of the technical idea of the present disclosure, and the scope of the present disclosure is not limited by the embodiment and the accompanying drawings.

The steps and/or operations in some forms of the present disclosure may occur in different orders, or in parallel, or simultaneously in different exemplary embodiments for different epochs and the like as may be appreciated by those skilled in the art.

Depending on the exemplary embodiment, a part or the entirety of the steps and/or operations may be implemented or performed by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "module" discussed in the present specification may be implemented by software, firmware, hardware, and/or any combination thereof.

Meanwhile, the embodiments according to the present disclosure may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the disclosure and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A light detection and ranging (LiDAR) sensor having a parameter optimization function, comprising:
    a laser diode configured to emit a laser light signal;
    a photo diode configured to receive a maximum laser light reflection signal reflected from a target object at a maximum distance in the laser light signal; and
    a parameter setting unit configured to optimize a parameter related to an output intensity of the laser light signal or a reception intensity of the laser light signal by:
    setting a parameter relating to an intensity of the laser light signal based an intensity of the maximum laser light reflection signal;
    receiving a laser reflection signal having an intensity based on the set parameter including at least one of the maximum laser light reflection signal and a proximity laser light reflection signal;

determine if an intensity of the received laser reflection signal exceeds an intensity of a preset saturation intensity, in response to a determination that the intensity of the received laser light reflection signal does not exceed the preset saturation intensity, determining if the intensity of the received laser reflection signal exceeds a preset threshold; and in response to a determination that the intensity of the received laser reflection signal exceeds a preset threshold, determining that a current state of the LiDAR sensor is a parameter optimization state, wherein the optimized parameter includes one or more selected from an adjusted bias voltage of the photo diode and an adjusted gain of a first amplifier included in the LiDAR sensor.

2. The LiDAR sensor of claim 1, further comprising:
a Laser Diode (LD) controller configured to:
change an output range of the laser diode based on the optimized parameter; and
emit a new laser light signal based on the changed output range.

3. The LiDAR sensor of claim 1, wherein the photo diode is configured to:
receive a laser light reflection signal reflected from the target object; and
applying the adjusted bias voltage according to the optimized parameter to the received laser light reflection signal.

4. The LiDAR sensor of claim 1,
wherein the first amplifier is configured to:
receive a laser light reflection signal reflected from the target object; and
adjusting an intensity of a laser light reflection signal reflected from the target object using the adjusted gain according to the optimized parameter.

5. The LiDAR sensor of claim 1, further comprising:
an Analog to Digital Converter (ADC) configured to:
convert the laser light reflection signal reflected from the target object according to the optimized parameter and transmit, to the parameter setting unit, the converted laser light reflection signal.

6. The LiDAR sensor of claim 1, further comprising:
a comparing unit configured to:
compare the maximum laser light reflection signal with a reference voltage; and
output a comparison result; and
a signal intensity determining unit configured to:
determine the intensity of the maximum laser light reflection signal by using the comparison result; and
transmit, to the parameter setting unit, a determination result.

7. The LiDAR sensor of claim 1, further comprising:
a Time to Digital Converter (TDC) configured to calculate a Time Of Flight (TOF) value by using a time interval between an emission time point of a new laser light signal emitted according to the optimized parameter and a reception time point of a new laser light reflection signal of which an intensity is changed according to the optimized parameter.

8. A method of calculating a Time Of Flight (TOF) value by a light detection and ranging (LiDAR) sensor, the method comprising:
detecting a target object at a maximum distance in a laser light signal based on reception of a maximum laser light reflection signal reflected from the target object;

optimizing a parameter related to an output intensity of a laser light signal or a reception intensity of the laser light signal by:
setting a parameter relating to an intensity of the laser light signal based an intensity of a maximum laser light reflection signal reflected from a target object at a maximum distance in the laser light signal;
receiving a laser reflection signal having an intensity based on the set parameter including at least one of the maximum laser light reflection signal and a proximity laser light reflection signal;
determine if an intensity of the received laser reflection signal exceeds an intensity of a preset saturation intensity,
in response to a determination that the intensity of the received laser light reflection signal does not exceed the preset saturation intensity, determining if the intensity of the received laser reflection signal exceeds a preset threshold; and
in response to a determination that the intensity of the received laser reflection signal exceeds a preset threshold, determining that a current state of the LiDAR sensor is a parameter optimization state; and
calculating the TOF value by using the laser light reflection signal according to the optimized parameter.

9. The method of claim 8, wherein the optimized parameter includes one or more selected from an output rage of a new laser light signal emitted from a laser diode of the LiDAR sensor, a bias voltage of a photo diode of the LiDAR sensor and a gain of an amplifier of the LiDAR sensor.

10. The method of claim 9, comprising:
changing the set parameter in response to a determination that the intensity of the maximum laser light reflection signal exceeds a preset saturation signal.

11. The LiDAR sensor of claim 1, wherein the parameter setting unit is further configured to reset the optimized parameter based on movement speed of the target object.

12. The method of claim 8, comprising:
resetting the optimized parameter based on movement speed of the target object.

13. The method of claim 8, wherein the calculating the TOF value based on reception of a second laser light reflection signal according to the optimized parameter includes:
calculating the TOF value base on a time interval between an emission time point of a new laser light signal emitted according to the optimized parameter and a reception time point of a new laser light signal reflection signal according to the optimized parameter.

14. A non-transitory computer-readable medium storing one or more instructions, which when executed by a processor of LiDAR sensor, caused the LiDAR sensor to:
emit a laser light signal;
receive a maximum laser light reflection signal reflected from a target object at a scannable maximum distance in the laser light signal; and
optimize a parameter related to an output intensity of the laser light signal or a reception intensity of the laser light signal by:
setting a parameter relating to an intensity of the laser light signal based an intensity of the maximum laser light reflection signal;
receiving a laser reflection signal having an intensity based on the set parameter including at least one of the maximum laser light reflection signal and a proximity laser light reflection signal;

determine if an intensity of the received laser reflection signal exceeds an intensity of a preset saturation intensity, in response to a determination that the intensity of the received laser light reflection signal does not exceed the preset saturation intensity, determining if the intensity of the received laser reflection signal exceeds a preset threshold; and in response to a determination that the intensity of the received laser reflection signal exceeds a preset threshold, determining that a current state of the LiDAR sensor is a parameter optimization state, wherein the optimized parameter includes one or more selected from an adjusted bias voltage of the photo diode and an adjusted gain of a first amplifier included in the LiDAR sensor.

15. The non-transitory computer-readable medium according to claim 14, wherein the processor is further caused to:

calculate a Time Of Flight (TOF) value by using a time interval between an emission time point of a new laser light signal emitted according to the optimized parameter and a reception time point of a new laser light reflection signal of which an intensity is changed according to the optimized parameter.

16. The non-transitory computer-readable medium according to claim 14, wherein the processor is further caused to:

reset the optimized parameter based on movement speed of the target object.

17. The non-transitory computer-readable medium according to claim 14, wherein the processor is further caused to:

compare the maximum laser light reflection signal with a reference voltage;

output a comparison result; and determine the intensity of the maximum laser light reflection signal by using the comparison result.

* * * * *